United States Patent Office 3,623,917
Patented Nov. 30, 1971

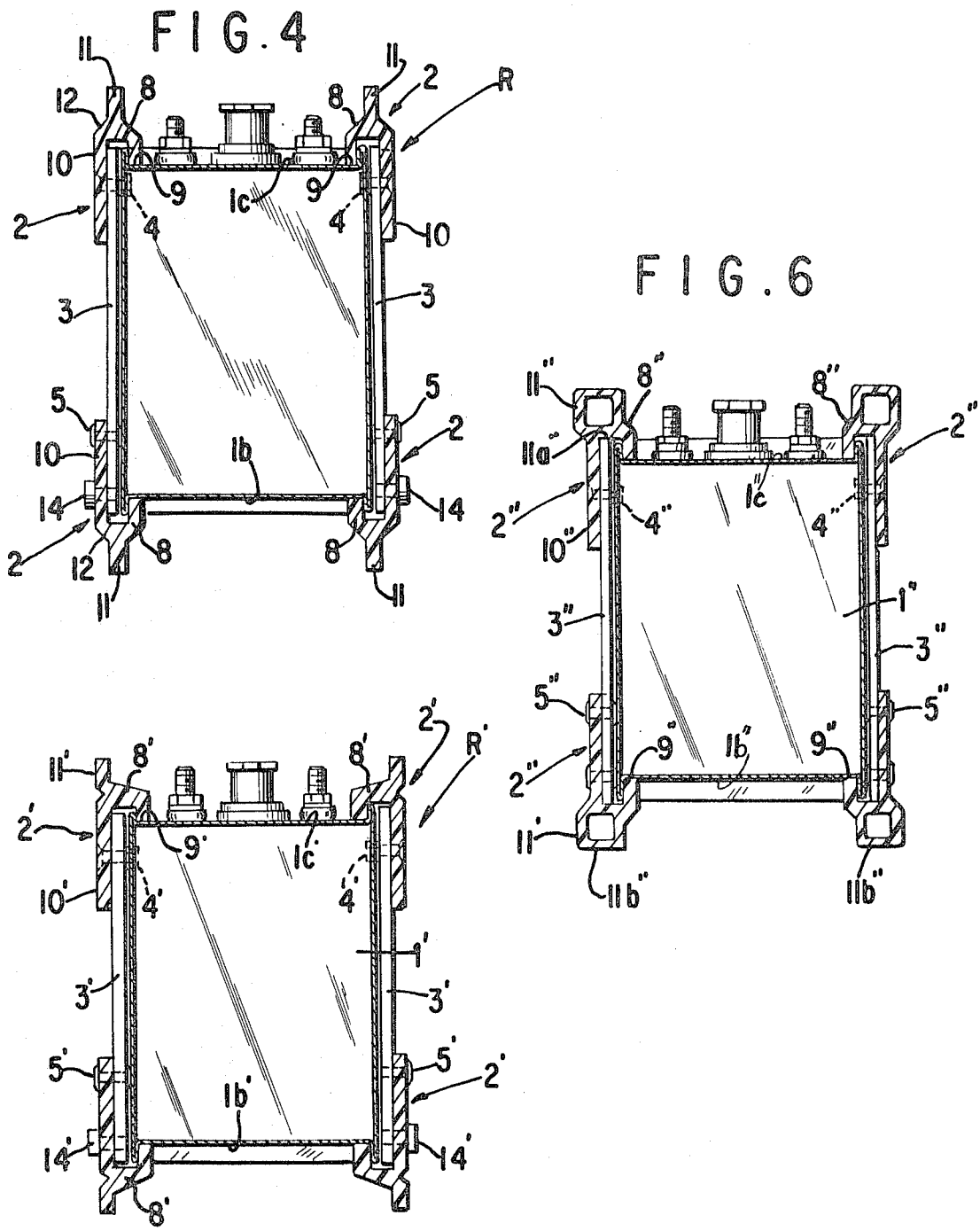

3,623,917
RACK FOR STORAGE BATTERIES
Rene Chassoux, Talence, France, assignor to Societe des Accumulateurs Fixes et de Traction (Societe Anonyme), Romaninville, France
Filed Dec. 29, 1969, Ser. No. 888,375
Claims priority, application France, Dec. 31, 1968, 183,133
Int. Cl. H01m 1/04
U.S. Cl. 136—171                                    17 Claims

ABSTRACT OF THE DISCLOSURE

A mounting rack for quick and effective mounting and support of a group of parallelepiped-shaped accumulators, particularly of the type having metal casings with recessed upper and lower end faces which embodies end pieces linked by longitudinal members which latter have inwardly facing hooking or clamping elements engaged with the casing edges defined by the recessed upper and lower end faces with the bottom parts of the hooking or clamping elements resting on the surfaces of the casing end faces. Thus, the group of accumulators are quickly assembled on the hooking or clamping elements of the lower longitudinal members and thereafter the upper longitudinal members are positioned to engage the upper casing edges and then secured to the end pieces as by bolting to provide a rigid secure support rack for the group of accumulators.

BRIEF SUMMARY OF INVENTION

The present invention relates to an improved rack for an assembled accumulator battery made up of a group of individual parallelepipe-shaped accumulators and especially those having metal casings.

In the art of alkaline accumulators racks are already known which comprise crates with longitudinal walls from which the accumulators of the group are suspended in side by side relationship by means of suspension protuberances or buttons fastened on the casings of the individual accumulators and engaging respectively in sockets provided along the longitudinal walls of the crate rack.

A rack of this kind is described by French Pat. 1,470,-408 filed on Jan. 12, 1966 by Societe des Accumulateurs Fixes et de Traction, as well as in the pertinent Addition thereto No. 91,387 dated Dec. 20, 1966 (no corresponding United States patents). It comprises two end pieces of metal joined by wooden longitudinal members having recesses or openings designed to cooperate by means of insulating buttons or sockets with the metallic protuberances provided on and fixed on the accumulator housings.

Though not indispensable, it is at least preferable that the accumulators of the group be suspended in the rack and do not rest on a bottom, for the overflow of electrolyte collecting on such a bottom would be likely to result in electric loss leaks between the various accumulators particularly those having metal containers.

Nevertheless, the suspension system used in said French Pat. No. 1,470,408 is attended by certain drawbacks.

First, it is necessary to provide the containers of each of the accumulators of the group with at least two, and preferably four, welded protuberances. The casings and the protuberances are, as a rule, made of nickel-plated steel and it is preferable to nickel-plate them prior to assembly, for, where the nickel-plating is performed following the positioning and securement of the protuberances, their inner surfaces would not be nickel-plated, and should any infiltration of electrolyte or moisture occur in defects of the welded joints, there would be a likelihood of corroding and weakening attack of the portions that have not been nickel-plated. However, the welding together of the nickel-plated parts is a delicate operation for it has to be performed without damaging the nickel-plating of any one of the parts being welded.

Moreover, the sockets on the longitudinal members intended to receive the protuberances welded onto the containers are likely to form another collecting site for spillage of electrolyte from the containers, with all the drawbacks that this is likely to entail, even if said sockets are lined with protective plastic.

It is an object of the instant invention to remedy these drawbacks and to eliminate completely the need for fastening suspension protuberances onto the containers of the accumulators mounted in the novel rack to form a battery.

Another object of the instant invention is the provision of a rack for a battery of grouped parallelepiped-shaped accumulators, said accumulators being supported within the rack, at least one part of the bottom and of the cover of the container or casing of each one of the accumulators being inwardly recessed with respect to the edges of the side walls of the said container or casing, the said rack comprising two end pieces linked by longitudinal members, the support of each one of the said accumulators being provided by the said longitudinal members and being characterized in particular in that the said longitudinal members are provided, facing inwardly, with projections acting as hooking and clamping elements disposed in such a way that their ends come to rest, respectively, on the recessed parts of the container or casing bottoms and on the recessed parts of the cover of each accumulator, hooking over the corresponding portions of the said container or casing edges.

Thus, according to the instant invention, the longitudinal wooden members of the said French Pat. 1,470,408 linking the end members of the rack there described have been replaced by plastic longitudinal members to which an appropriate configuration has been imparted so as to bring about the simple and quick hooking suspension and the rigid clamping of the accumulators of the group forming the battery. Such an arrangement makes it possible to eliminate the need for protuberances on the containers which, according to the prior art, were indispensable for effecting the suspension of the accumulators in the wooden rack of said French patent.

According to a preferred embodiment, the said clamping or hooking elements extend over the entire length of the edge with which they will interlock in such a way as also to prevent a lateral displacement of the respective individual accumulators of the assembled group.

According to one embodiment, the end pieces of the novel rack are joined by four longitudinal elements all of similar shape.

According to another characteristic of the invention, the respective longitudinal elements are made preferably of a synthetic plastic material, for instance, polypropylene. They might likewise be made of polyethylene, polyamide, acrylonitrile-butadiene-styrene or the like, etc. Thus, they may be produced by extrusion followed by suitable milling or other machining to define the required width of the hooking elements and/or to create needed orifices for their attachment to the end pieces or other components, in addition being of synthetic plastic material they are not subject to corrosion or damage from electrolyte or environmental moisture.

According to another feature and characteristic of the invention, the longitudinal elements each comprise mainly an elongated rectangular plate, the said hooking or clamping elements extending first substantially perpendicular to one side of the said plate and then substantially parallel to said side to provide the required hooking form for such elements.

According to one embodiment, each said plate comprises two parallel parts offset with respect to one another and joined by a biased portion extending parallel to their common length, the said hooking elements being located on each of the said plates at the level of the said biased portion.

According to another embodiment, the portion of the plate of each longitudinal element bearing the hooking elements has a substantially square hollow profile, the portion of the said hooking elements extending perpendicular to the plate being at least in part constituted by one of the sides of the said square profile.

According to one embodiment, the said square profile juts out on either side of the main plane of the plate of the longitudinal member.

The parts of the said square profile situated toward the inside with respect to the plane of the inner vertical side of the said plate have been removed between the hooking elements.

The outer end pieces of the rack may comprise U-shaped elements made of a synthetic material such as that mentioned for the longitudinal elements or else may be of a metal that can withstand corrosion, for instance, stainless or nickel-plated steel or the like.

One advantage of the instant invention resides in that it provides for ease of assembly: it is far easier to locate and position the accumulators of the group on the longitudinal elements embodying the invention than on the longitudinal wooden elements of the prior art into each socket of which it has been necessary to lodge, first, an insulating protector and then the metallic protuberances integral with the individual accumulators of the group being mounted.

Other features and characteristics of the invention will become evident from the description that follows and from the annexed drawings in which:

FIG. 4 is a cross-section taken along line 4—4 of FIG. 1;

FIG. 5 is a cross-section taken along line 5—5 of FIG. 2; and

FIG. 6 is a cross-section taken along line 6—6 of FIG. 3.

DETAILED DESCRIPTION

Figure 1:
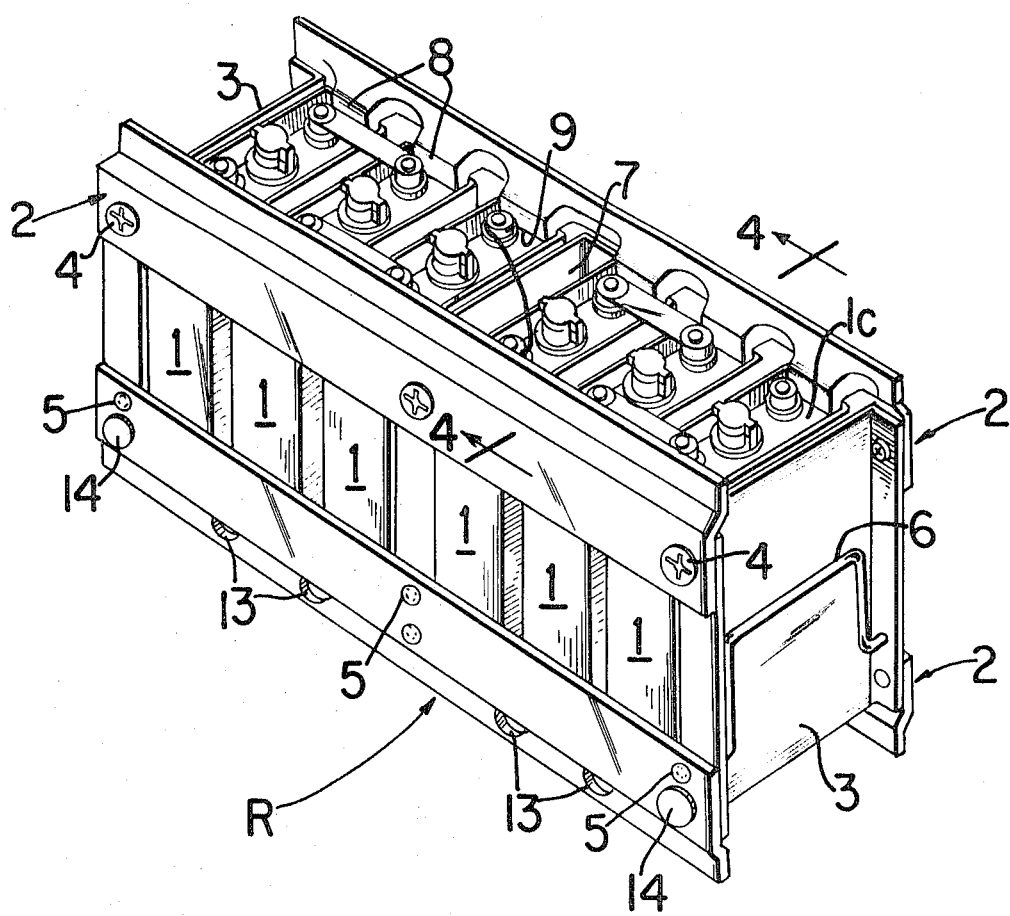
FIG. 1 is a perspective view of a first embodiment in accordance with the invention.
Figure 3:
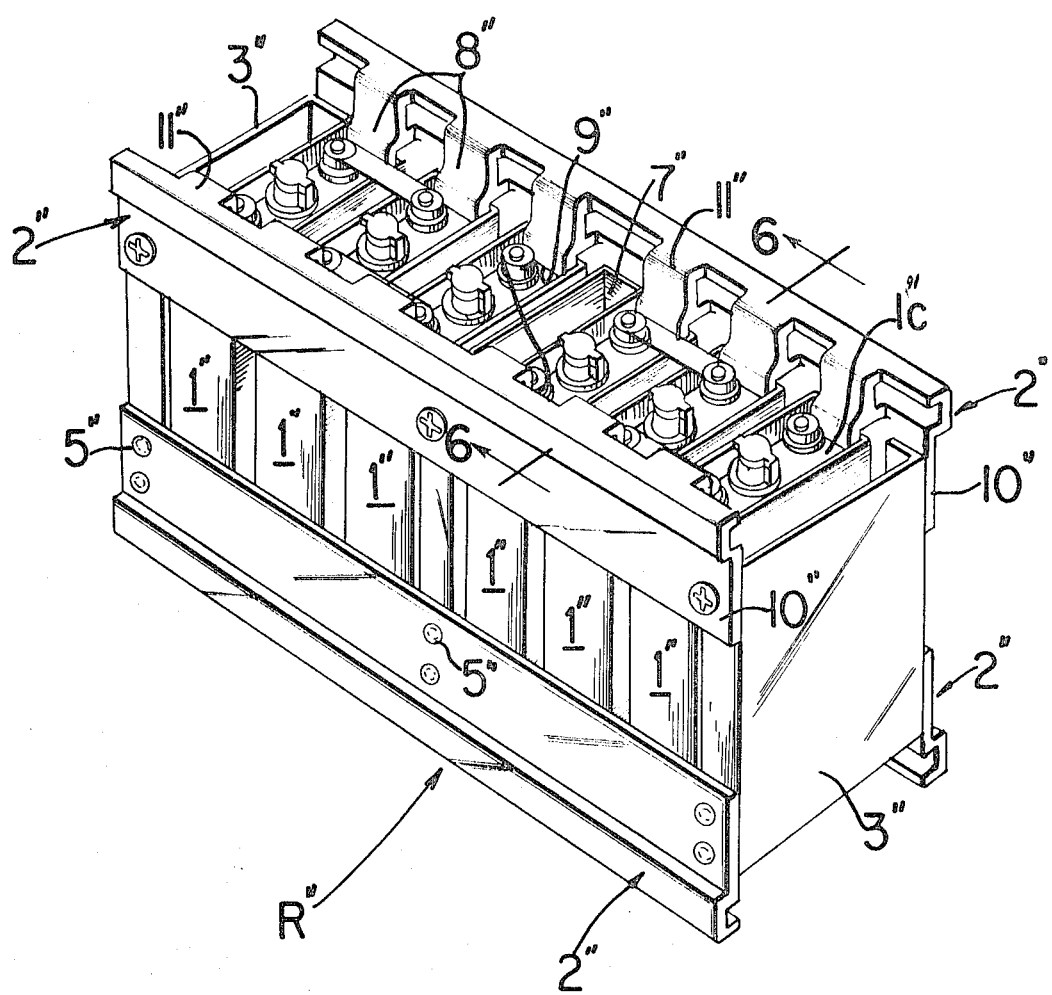
FIG. 3 is a perspective view of a third embodiment in accordance with the invention.

In FIGS. 1 and 3, reference 1 designates the parallelepiped-shaped accumulators. In this embodiment, the bottoms $1_b$ and tops $1_c$ of the said accumulators have the shape of pans, in other words, the bottoms and the covers of the said accumulators are recessed or inwardly offset with respect to the upper and lower edges of the vertical lateral walls of the said accumulators. The rack R of FIGS. 1 and 4 comprises mainly four longitudinal elements, designated by the reference 2, and two end pieces 3. The accumulators 1 as seen in FIG. 1 have been arranged one beside the other in somewhat spaced relationship along the length of the rack R, their side faces being parallel to those of the end pieces 3 of the rack. The longitudinal elements 2 and the outer end pieces 3 may be assembled together by an suitable means, for instance, by bolts 4 and rivets 5.

In FIGS. 1 and 4 of the drawings, it can be seen that the upper longitudinal elements 2 of the rack R are assembled with end pieces 3 by means of bolts 4 so as to permit their subsequent dismantling whereas, as far as the lower longitudinal elements 2 are concerned, their assembly with the end pieces 3 is effected by use of rivets 5.

In FIGS. 1 and 4, the outer pieces 3 of the rack are U-sections, whose legs may face toward the outside of the rack R (FIG. 1). In this case, a pivoted handle 6 can be provided on each end piece 3 which can be folded to lie inside of the profile of the respective U-sectioned end piece 3.

The outer end pieces 3 may be made of stainless steel, nickel-plated iron, or else of a synthetic material like that of members 2 and, in the latter case, can be produced by extrusion.

It is possible optionally to arrange, between the end pieces 3, other similarly profiled elements, such as 7, each having a configuration similar to that of the said end pieces 3 so as to reinforce the rigidity of the whole rack R in order to prevent the flexing or bending of the longitudinal elements 2 if the latter are of great length.

The longitudinal elements 2 of FIGS. 1 and 4 comprise mainly, elongated rectangular plates. In accordance with the invention, each of said longitudinal elements 2 is provided along its inside face with a plurality of spaced projections 8 shaped to act as hooks that each extend, initially, substantially perpendicular to the inside face of the plates and then downwardly parallel to the said inner face so that their respective extremities 9 may come to rest on, respectively, the recessed bottoms $1_b$ and covers $1_c$ of the accumulators 1. The widths of each extremity 9 of the respective projections 8, that is, the dimension parallel to the length of the rack is substantially equal to the width of the respective bottoms $1_b$ and covers $1_c$ of the respective accumulators. Thus, as can be seen in FIG. 1, when the extremities 9 fit in the recessed cover $1_c$ and bottom $1_b$ and accumulators 1 are maintained against lateral as well as vertical displacement.

In the embodiment shown in FIGS. 1 and 4, the plate 2 carrying the projections 8 comprises two parallel portions 10 and 11, offset with respect to one another and joined by a biased portion 12 extending parallel to their lengths, the spaced projections 8 being located at the level of the said biased portion 12.

In FIG. 1, the lower longitudinal elements 2 are provided in their portions 11 with holes 13 to allow outflow of excess electrolyte that may have been spilled at the time of the filling of the accumulators.

The longitudinal elements 2 may be made of synthetic plastic material, for instance, of polypropylene, polyethylene, polyamide, acrylonitrile-butadiene-styrene or other suitable material resistant to environmental conditions and to electrolyte.

They may be produced by means of extrusion followed by suitable millings and machining so as to define the width of the spaced projections 8 and create openings serving for their attachment and other necessary treatment.

Preferably, the outer faces of the lower longitudinal members 2 also can be provided with spacing studs 14 designed to maintain a definite space between adjacent racks R of a plurality of rack-carried batteries located side by side, thereby permitting an improved circulation of the air. These studs 14, made, for instance, of synthetic material, can be separately mounted on said lower elements 2 or directly attached to the rivets 5 that join the lower longitudinal elements 2 and the end pieces 3 of the rack R.

Figure 2:
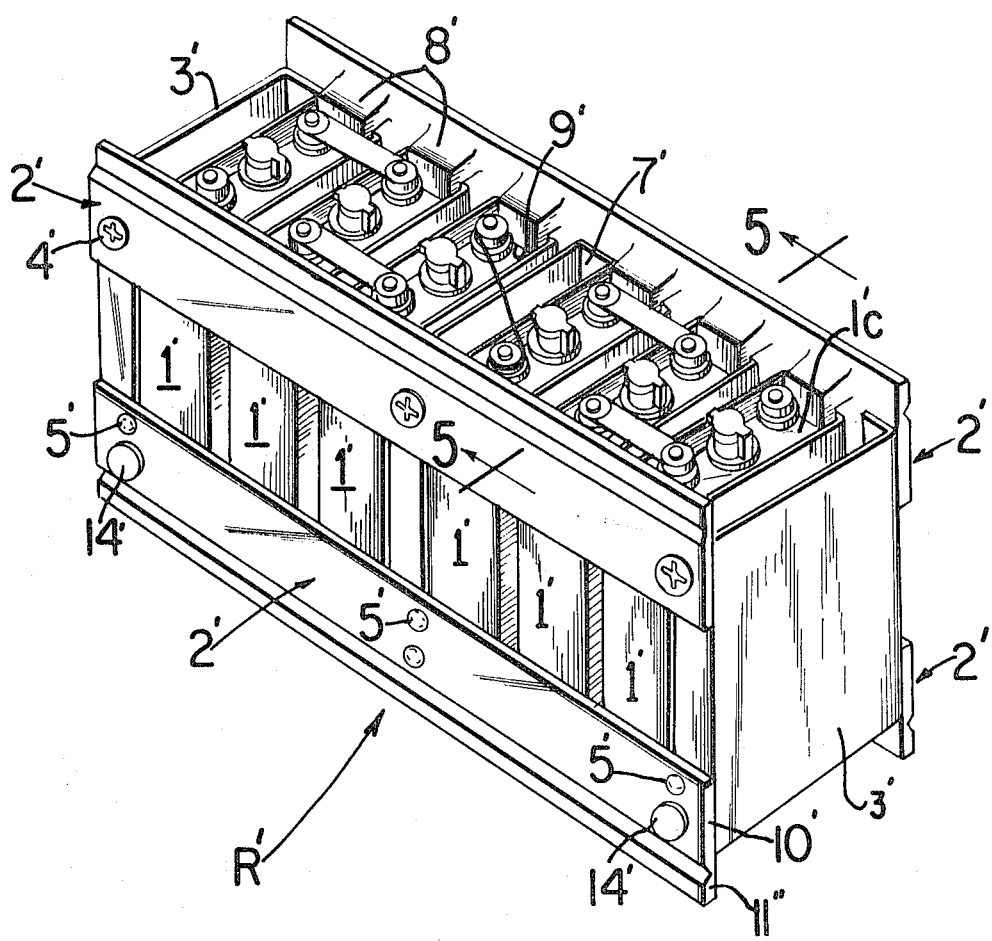
FIG. 2 is a perspective view of a second embodiment in accordance with the invention.

In the embodiment shown in FIGS. 2 and 5, all parts bearing like reference characters but primed perform similar functions. The chief difference between this embodiment of FIGS. 2 and 5 and that of FIGS. 1 and 4 is that the longitudinal elements 2' have a somewhat modified form in that the parallel portions 10' and 11' of these elements 2' are co-planar rather than being offset relative to each other as is the case of parallel portions 10 and 11 of the members 2 of FIGS. 1 and 3 and hence there is no need for a biased connecting portion like portion 12 of FIGS. 1 and 4. Moreover, in FIG. 2, the end U-sectioned end pieces 3' have their legs facing inwardly of the rack R' rather than outwardly as in FIG. 1. The materials used for end pieces 3' and longitudinal members 2' may be the same as those for corresponding parts 2 and 3 as mentioned above.

FIGS. 3 and 6 depict another embodiment, parts bearing double primed reference characters corresponding to those of FIGS. 1 and 2. Herein, the longitudinal elements 2" are of modified form. The portions 11" of these elements 2" have a substantially square, hollow profile projecting laterally on each side of the plane of the portions 10" of said elements 2" the parts 11"a of the said square profile facing inside with respect to the plane of the vertical side of the plate being removed between the spaced projections 8".

As can be seen, particularly in FIG. 6, the part of the projections 8" extending perpendicular to the inside of the element 2" are formed, in part by one of the sides 11a" of the said square profile portion 11".

The bottoms 11"b of the square profile portions 11" of the lower longitudinal elements 2" constitute a broad area support base for rack R" of the battery of grouped accumulators.

As can be readily understood, the racks R, R' and R" can be supplied in assembled condition to the user. When it is desired to mount groups of accumulators 1, 1' and 1" in respective racks, their upper longitudinal members 2, 2' and 2" are removed by removal of bolts 4, 4' or 4". The individual parallelepiped-shaped accumulators are then placed inside of the partially disassembled racks so that the lower end edges are engaged by respective spaced-apart hooking members or elements 8, 8' or 8", of lower longitudinal members 2, 2' or 2". Then the upper longitudinal members 2, 2' or 2" are mounted so that their spaced-apart hooking elements 8, 8' or 8" engage over the upper end edges of the respective accumulators of the group. Then, these upper longitudinal members are resecured to the respective end pieces 3, 3' or 3" by bolts 4, 4' or 4". Since each hooking members 8, 8' or 8" has the width of the respective covers or bottoms of the respective accumulators 1, 1' or 1", they fit snugly in place with their extremities 9, 9' or 9" resting on the outer surfaces of the covers and bottoms of the casings or housings of the respective accumulators 1, 1' or 1" and thus firmly hold the accumulators against any displacement in any direction in the racks R, R' or R".

It is, of course understood that the invention is not limited to the modes of realization described and represented which have been indicated by way of example only. In particular it is possible, without departing from the framework of the claimed invention, to make detail changes to change certain arrangements or to replace certain means by equivalent ones.

For example, only portions of the accumulator bottoms or covers need be recessed with like dimensional changes in elements 8, 8' or 8". Moreover, it is likewise possible in such event to provide that the portions of projections 8, 8' or 8" of certain longitudinal elements 2, 2' or 2" should not be hooked over where not needed to rest on recessed parts of the covers or bottoms of the said accumulators.

There is no intention, therefore, of limitation to the exact abstract or disclosure herein discribed.

What is claimed is:

1. In combination with a group of like electrical cells, a rack for supporting cells of said group in spaced and rigid secure relationship with respect to each other, each cell including a cover and a bottom and a surrounding casing with peripheral edge portions of said casing projecting outwardly respectively of the cover and bottom, said rack comprising a pair of end pieces, upper and lower longitudinal elements joining said end pieces, spaced-apart hooking means integral with said pieces and having free ends extending from each of said longitudinal elements, said hooking means being respectively engageable over peripheral edge portions of respective cell casings at their bottoms and covers with the free ends of said hooking means resting on surfaces of the respective bottoms and covers so as to clamp said cells rigidly against lateral and longitudinal displacement in said rack.

2. In the combination according to claim 1, said hooking means respectively having a longitudinal dimension substantially equal to the lengths of the respective peripheral edge portions of the respective casings over which they engage and wherein the respective covers and bottoms are secured to respective of said edge portions whereby said hooking means prevent lateral displacement of the cells mounted in the rack.

3. In the combination according to claim 1, said cells each being of parallelepiped shape whose bottoms and covers each are secured to lateral and longitudinal peripheral edge portions of walls of the respective casings and which edge portions project beyond surfaces of said bottoms and covers, and wherein said hooking means respectively have dimensions substantially equal to lengths of respective lateral peripheral edge portions of said walls over which they engage and thus are confined respectively between longitudinal peripheral edge portions of said walls to prevent lateral displacement relative to each other of respective cells mounted in the rack.

4. In the combination according to claim 1, two end pieces for said rack, four of said longitudinal elements of similar configuration and means for securing respective of said upper and lower longitudinal elements to said end pieces at upper and lower corners of the latter.

5. In the combination according to claim 4, said last-named means comprises rivets for permanently securing the lower longitudinal elements to said end pieces and removable bolt means for removably securing the upper longitudinal members to said end pieces to facilitate assembly and disassembly of cells from the rack.

6. In combination with a group of like electrical cells, a rack for supporting cells of said group in spaced and rigid secure relationship with respect to each other, each cell including a cover and a bottom and a surrounding casing with peripheral edge portions of said casing projecting outwardly respectively of the cover and bottom, said rack comprising a pair of end pieces, upper and lower longitudinal elements joining said end pieces, spaced-apart hooking means integral with said pieces and having free ends extending from each of said longitudinal elements, said hooking means being respectively engageable over peripheral edge portions of respective cell casings at their bottoms and covers with the free ends of said hooking means resting on surfaces of the respective bottoms and covers of said respective accumulators so as to clamp said cells rigidly against lateral and longitudinal displacement in said rack, each of said longitudinal elements being a substantially rectangular elongated plate from a face of which said hooking means have portions which respectively project first substantially perpendicular to said face, then downwardly substantially parallel to said face and terminates in said free ends.

7. In the combination according to claim 6, each said element comprising a pair of parallel portions offset with respect to each other and a biased portion joining said parallel portions, said hooking means extending from said face at the level of said biased portion.

8. In the combination according to claim 6, each element having a portion of substantially hollow square profile, and wherein the substantially perpendicular projecting portion of said spaced-apart hooking means in part comprises one of the walls of said hollow square profile.

9. In the combination according to claim 8, said portion of hollow square profile of the element projecting laterally with respect to both side faces of each plate.

10. In the combination according to claim 8, wall portions of the hollow square profile between spaced-apart hooking means being removed.

11. In the combination according to claim 6 spacer stud means projecting outwardly from at least one of said longitudinal members to provide air circulation space between adjacent racks bearing respective groups of said cells.

12. In the combination according to claim 6 some of said longitudinal elements have drainage openings therein for drainage of spillage and overflow from said cells.

13. In the combination according to claim 6 at least one additional piece similar to said pair of end pieces located and secured to the longitudinal elements intermediate the said end pieces to improve rigidity of the longitudinal elements.

14. In the combination according to claim 6, each of said pair of end pieces having substantially U-shaped sections to whose side legs said longitudinal elements are respectively secured.

15. In the combination according to claim 13 each of said end pieces and said additional piece having substantially U-shaped sections.

16. In the combination according to claim 6, said longitudinal elements being of synthetic plastic material.

17. In the combination according to claim 6, said end pieces being of material resistant to corrosive action of cell electrolyte and environment.

References Cited

UNITED STATES PATENTS

| | | | |
|---|---|---|---|
| 1,304,588 | 5/1919 | Monahan | 136—171 |
| 1,651,753 | 12/1927 | Dayes | 136—173 |
| 2,942,058 | 6/1960 | Herold | 136—173 |
| 2,980,752 | 4/1961 | Toce et al. | 136—171 |
| 3,342,645 | 9/1967 | Godard et al. | 136—173 |

FOREIGN PATENTS

| | | | |
|---|---|---|---|
| 265,991 | 8/1927 | Great Britain | 136—173 |
| 1,312,948 | 12/1962 | France | 136—173 |
| 1,470,408 | 4/1902 | France | 136—171 |

DONALD L. WALTON, Primary Examiner

U.S. Cl. X.R.

136—173